E. SPIEGEL.
APPARATUS FOR MAKING LEATHER TIRES.
APPLICATION FILED DEC. 19, 1910.

1,037,352.

Patented Sept. 3, 1912.

2 SHEETS—SHEET 1.

Witnesses
H. H. Knight,
Ray J. Ernst.

Inventor
Emil Spiegel
by his attorneys

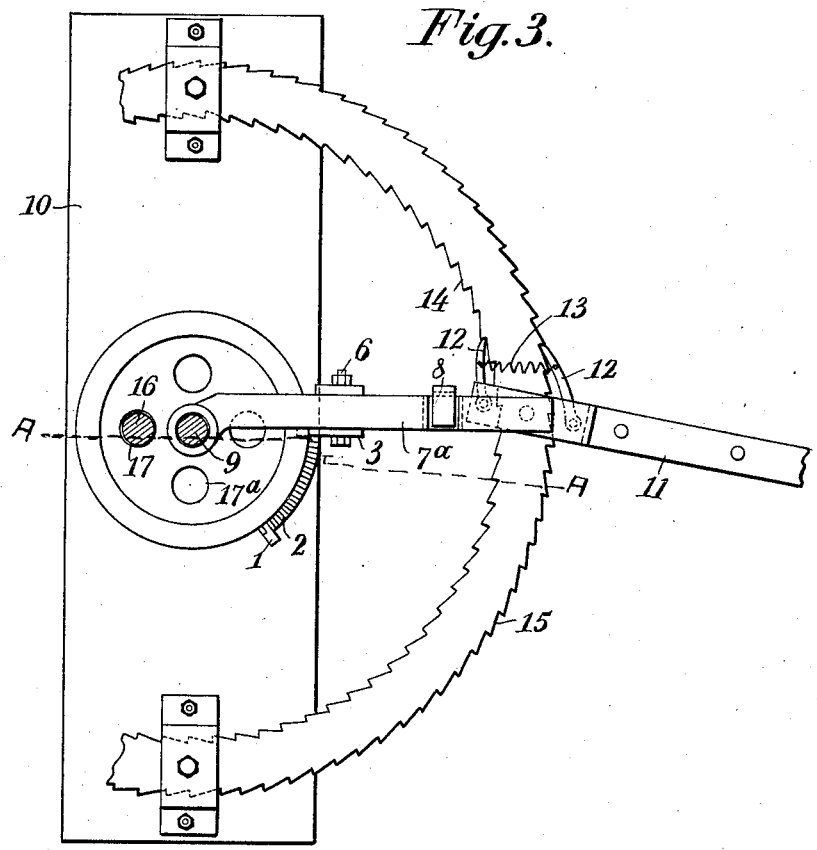
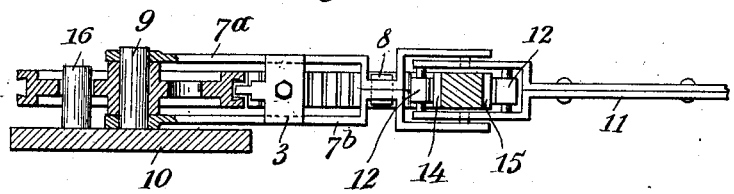

UNITED STATES PATENT OFFICE.

EMIL SPIEGEL, OF WARNSDORF, AUSTRIA-HUNGARY.

APPARATUS FOR MAKING LEATHER TIRES.

1,037,352.  Specification of Letters Patent.  Patented Sept. 3, 1912.

Application filed December 19, 1910. Serial No. 598,202.

*To all whom it may concern:*

Be it known that I, EMIL SPIEGEL, a subject of Austria, and resident of Warnsdorf, in the Kingdom of Bohemia and Empire of Austria-Hungary, have invented certain new and useful Improvements in Apparatus for Making Leather Tires for Wheels, of which the following is a full, clear, and exact description.

Leather tires for wheels, in which the tire is composed of strips disposed transversely or obliquely to the rim, have hitherto been made by the separate strips being arranged so as to engage in the groove of the rim as closely as possible to one another. The insertion of the last members is however rendered difficult as they can no longer be inserted obliquely, accordingly they have to be of special shapes, while it has not hitherto been possible to give the finished leather tire itself a great compression, so that when it dries it becomes loose and falls apart. Now this invention has for its object an apparatus for making leather tires composed of strips for wheels, in which tires the insertion of the last strips is also effected without the latter being specially shaped, and the leather tire is made under great pressure, so that it is impossible for it later on to become loose for any reason.

Figure 1:
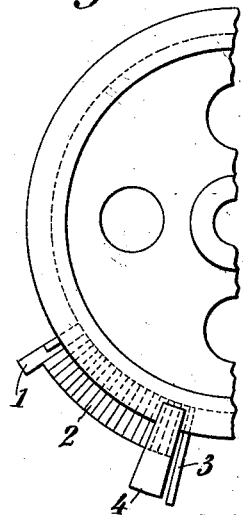
Figure 2:
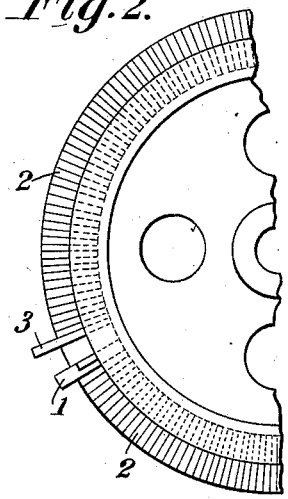
Figure 5:
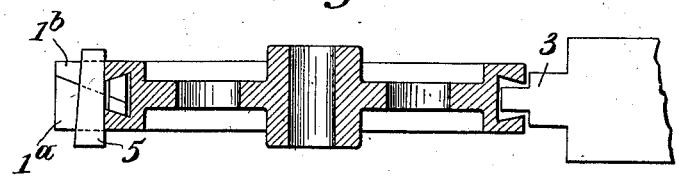
Figure 6:
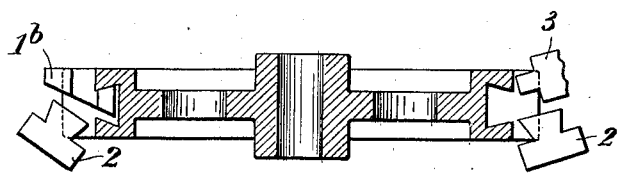

Referring to the drawings which form a part of this specification, Figure 1 shows a part of a wheel at the commencement of the insertion of the leather strips in front elevation; Fig. 2 shows a part of a wheel at the end of the insertion of the leather strips also in front elevation; Fig. 3 is a plan view of the apparatus for inserting the leather strips in the wheel; Fig. 4 is a cross section on line A—A of Fig. 3; Fig. 5 is a cross section through the wheel showing the abutment and the pressure-piece inserted, and Fig. 6 is a cross section of the wheel indicating the insertion of leather strips in place of the abutment and the pressure-piece.

The strips are inserted in the groove of the rim commencing from a removable abutment, and continuously pressed together by means of a pressure piece engaging in the groove of the rim and against the abutment, until at the end of the filling operation the pressure piece and the abutment are removed from the groove of the rim and also during the removal, strips which replace them are simultaneously inserted, so that the high tension in the leather tire produced by the constant strong compression is permanently maintained. The abutment and the pressure piece are also formed in such a way that even before their complete removal from the rim, the insertion of the replacement strips may be commenced, whereby any slackening when inserting these final members is avoided.

For wheels of large dimensions it is advisable to effect the compression of the strips in groups, as is shown in the accompanying drawings by the diagram according to Fig. 1. The insertion piece or abutment 1, the arrangement of which will be hereinafter described, is first fixed in the rim, and then a suitable number of strips 2 inserted in the rim and pressed by means of a pressure piece 3 against the abutment 1. In order to prevent, when inserting fresh strips, the slackening of the already compressed strips, the final members of the group are connected with the rim and retained by means of a suitably formed easily removable clamp 4 gripping the leather pieces and the rim of the tire. The insertion and compression of the strips is continued in similar manner until the interval between the insertion piece 1 and the piece 3 is so small that it is no longer possible to insert the strips obliquely which stage of manufacture is shown in Fig. 2. The final members are now inserted in a radial position and their dove-tailed continuation driven into the rim. The deformation which they undergo is, however, not permanent and is again removed by the strong pressure of the closely packed final members. When the wheel rim is filled, the insertion piece 1 and pressure piece 3 are replaced by leather strips, the pieces to be replaced being so formed, in order to allow of this operation, that the leather strips may be driven in before the other parts are completely removed. Thus, for instance, the operative surface of the pressure piece 3, as shown in Fig. 5 is made smaller than the section of the groove of the rim, in order to enable the driving in of the replacing strips to be commenced, while they are in an oblique position (Fig. 6), and the insertion piece is composed of two parts 1ª and 1ᵇ adapted to be fixed by means of an ordinary tightening wedge 5, so that after the removal of one of the parts space is available for the strips which are to be inserted (Figs.

5 and 6). The finished ring of strips is preferably further subjected to a suitable treatment, for istance, by hammering, to equalize the pressures in the wheel rim after which it may be turned down in a lathe.

The strips are pressed together with considerable pressure. The pressure piece may be operated by machinery or by hand. In the case of hand operation, strong leverage is necessary which according to the apparatus shown in Figs. 3 and 4 in plan view and cross section, may be effected by means of a peculiar mechanism.

The pressure piece 3 is pressed by means of a scew 6 on the faces of the holder or support 7ª and 7ᵇ, formed in two parts, held together by a clamp 8 adapted to be pushed over them. The support is pivoted on bolt 9 of the bed plate 10 and its free end is pivoted to an oscillating lever 11, which has, on both sides of the pivot, pawls 12 which are pressed by a spring 13 or the like on the row of teeth 14 and 15. On the lever 11 making a rocking movement the pawls form alternate supports for turning the lever, whereby any idle movement is avoided. A special advantage of the apparatus also consists in that the connection of the support with the pivot 9 and also the connection of the pressure piece 3 with the support 7ª, 7ᵇ are releasable in a simple and rapid manner. The release of the first connection is necessary as soon as the pressure piece 3 or the support 7ª, 7ᵇ prevents further insertion of the strips, which will arise when the wheel is about half set with strips, and then a displacement of the wheel on its gripping device must be made. This is done in a simple manner by lifting the wheel off the bolts 9, 16, which pass through the bore of the hub and the opening 17 respectively and again placing it thereon in such a position that the bolt 16 now passes through the opening 17ª of the wheel. It is first necessary to remove the part 7ª of the support, which operation may be easily carried out after the pressure piece 3 has been released by loosening bolt 6 and after the clamp 8 has also been removed. As soon as the wheel is filled the abutment 1 and pressure piece 3 are to be replaced by leather strips and it is preferable to do this when the wheel has been taken off. The pressure piece 3 is then removed from the wheel in the manner already described, one or more strips being at the same time inserted in its place and then the wedge of the abutment 1 is removed, the part 1ª lifted out, one or more strips inserted and driven farther in on the then succeeding removal of the second part 1ᵇ, so that the pressure of the entire leather tire can never yield to any considerable extent. The movement of the pressure piece may of course be effected in any other suitable way, for instance by means of a worm and worm gear, or by direct pressure (hydraulic press) and so forth. Of course the pressure piece 3 may be connected with the wheel and this be revoluble while the abutment 1 is fixed.

Having now described my invention what I claim as new and desire to secure by Letters Patent is:

1. A device for making leather tires for wheels of strips comprising a grooved wheel, a fixed abutment in the groove against which the strips are forced and a movable pressure piece adapted to move in the wheel groove toward said abutment to compress the strips inserted in the said groove, said abutment and pressure piece being detachably mounted to permit under the pressure of the compressed strips their replacement by leather strips.

2. A device for making leather tires for wheels of strips comprising a wheel having a grooved rim, means for rigidly holding said wheel, an abutment suitably fixed in the groove of said rim against which the strips are forced, a movable pressure piece in said groove and a supporting arm therefor to move it in said groove toward said abutment to compress the strips inserted in said groove, said arm pivoted in the center of the wheel.

3. A device for making leather tires for wheels of strips comprising a wheel having a grooved rim, means for rigidly holding said wheel, an abutment suitably fixed in the groove of said rim against which the strips are forced, a movable pressure piece in said groove and a supporting arm therefor to move it in said groove toward said abutment to compress the strips inserted in said groove, said arm pivoted in the center of the wheel and having a lever pivoted to its end which carries a pawl on either side of said pivot, a circular ratchet bar fixed adjacent to said lever concentrically with said wheel and having one of said pawls adjacent to its inner and the other adjacent to its outer periphery and having both peripheries provided with ratchet teeth for said pawls, said pawls serving alternately as a fulcrum for said lever by their alternate engagement with the teeth of the bar when the lever is rocked in either direction to move the arm toward said abutment.

4. A device for making leather tires for wheels of strips comprising a wheel having a grooved rim, means for rigidly holding said wheel, an abutment suitably fixed in the groove of said rim against which the strips are forced, a movable pressure piece in said groove and a supporting arm therefor to move it in said groove toward said abutment to compress the strips inserted in said groove, said arm pivoted in the center of the wheel, said pressure piece being detachably mounted on said arm to permit the insertion of a replacement leather strip for the pressure piece when the whole rim or a section thereof is filled with strips.

5. A device for making leather tires for wheels of strips comprising a wheel having a grooved rim, means for rigidly holding said wheel, an abutment suitably fixed in the groove of said rim against which the strips are forced, a movable pressure piece in said groove and a supporting arm therefor to move it in said groove toward said abutment to compress the strips inserted in said groove, said arm pivoted in the center of the wheel, said pressure piece being detachably mounted on said arm to permit the insertion of a replacement leather strip for the pressure piece when the whole rim or a section thereof is filled with strips, said arm having a lever pivoted to its end which carries a pawl on either side of said pivot, a circular ratchet bar fixed adjacent to said lever concentrically with said wheel and having one of said pawls adjacent to its inner and the other adjacent to its outer periphery and having both peripheries provided with ratchet teeth for said pawls, said pawls serving alternately as a fulcrum for said lever by their alternate engagement with the teeth of the bar when the lever is rocked in either direction to move the arm toward said abutment.

6. A device for making leather tires in wheels of strips comprising a grooved wheel, a fixed abutment in the groove against which the strips are forced and a movable pressure piece adapted to move in the wheel groove toward said abutment to compress the strips inserted in the said groove, said fixed abutment comprising singly removable sections to permit the substitution of the leather strips in said sections when the whole rim or a section thereof is filled with leather strips without lessening the compression of said strips.

In witness whereof, I have hereunto signed my name in the presence of two subscribing witnesses.

EMIL SPIEGEL.

Witnesses:
 FRANZ SIMON,
 CON M. CARR.

Copies of this patent may be obtained for five cents each, by addressing the "Commissioner of Patents, Washington, D. C."